(12) United States Patent
Boen et al.

(10) Patent No.: US 9,662,693 B2
(45) Date of Patent: May 30, 2017

(54) INDUCTION FURNACE AND METHOD FOR TREATING METAL WASTE TO BE STORED

(71) Applicants: Commissariat à l'énergie atomique et aux énergies alternatives, Paris (FR); Areva NC, Courbevoie (FR)

(72) Inventors: Roger Boen, Saint-Alexandre (FR); Armand Bonnetier, Orange (FR)

(73) Assignees: COMMISSARIAT A L'ENERGIE ATOMIQUE ET AUX ENERGIES ALTERNATIVES, Paris (FR); AREVA NC, Courbevoie (FR)

( * ) Notice: Subject to any disclaimer, the term of this patent is extended or adjusted under 35 U.S.C. 154(b) by 28 days.

(21) Appl. No.: 14/766,791

(22) PCT Filed: Feb. 17, 2014

(86) PCT No.: PCT/EP2014/053027
§ 371 (c)(1),
(2) Date: Aug. 10, 2015

(87) PCT Pub. No.: WO2014/125107
PCT Pub. Date: Aug. 21, 2014

(65) Prior Publication Data
US 2015/0360267 A1    Dec. 17, 2015

(30) Foreign Application Priority Data

Feb. 18, 2013    (FR) ..................... 13 51358

(51) Int. Cl.
*B09B 3/00* (2006.01)
*F27B 14/06* (2006.01)
(Continued)

(52) U.S. Cl.
CPC .......... *B09B 3/0083* (2013.01); *F27B 14/061* (2013.01); *F27B 14/10* (2013.01);
(Continued)

(58) Field of Classification Search
CPC ..... B09B 3/008; F27B 14/061; F27B 14/0843
See application file for complete search history.

(56) References Cited

U.S. PATENT DOCUMENTS

| 6,393,044 B1 | 5/2002 | Fishman |
| 7,197,061 B1 | 3/2007 | Fishman |
| | (Continued) | |

FOREIGN PATENT DOCUMENTS

| DE | 2 243 769 A1 | 5/1974 |
| FR | 1 292 863 A | 5/1962 |
| | (Continued) | |

OTHER PUBLICATIONS

Erwin Dotsch, "Les fours électriques de fusion, de maintien et de coulée" Fonderie, No. 9, Nov. 2010.
(Continued)

*Primary Examiner* — John Kreck
(74) *Attorney, Agent, or Firm* — Pearne & Gordon, LLP

(57) ABSTRACT

The melting induction furnace comprises, together with a casing (7) to which a lower sole plate (11) is added to form the central part of the structure, a removable inner crucible (1) composed of an internal layer (4) resisting heat and aggressiveness of the molten bath (20), an external layer (6) delimiting the crucible and an insulating intermediate layer (5). The crucible (1) is a disposable crucible and can be stored with its charge in an appropriate container. Heat losses are low, even when the casing (7) is cooled. Stresses due to differential thermal expansions are also very much reduced.

6 Claims, 1 Drawing Sheet

(51) Int. Cl.
*F27B 14/10* (2006.01)
*F27B 14/14* (2006.01)
*F27D 11/06* (2006.01)
*F27B 14/08* (2006.01)

(52) U.S. Cl.
CPC .............. *F27B 14/14* (2013.01); *F27D 11/06* (2013.01); *F27B 2014/0843* (2013.01); *F27B 2014/104* (2013.01)

(56) References Cited

U.S. PATENT DOCUMENTS

| | | |
|---|---|---|
| 2003/0121331 A1 | 7/2003 | Mitsuoka |
| 2003/0213575 A1* | 11/2003 | Todaro ................. C21C 5/5241 164/135 |
| 2011/0144408 A1 | 6/2011 | Gruber |
| 2012/0300806 A1* | 11/2012 | Prabhu ................. F27B 14/061 373/145 |

FOREIGN PATENT DOCUMENTS

| | | |
|---|---|---|
| FR | 2 835 620 A1 | 8/2003 |
| GB | 2 161 591 A | 1/1986 |
| JP | 2012-068017 A | 4/2012 |
| WO | 03/067166 A2 | 8/2003 |

OTHER PUBLICATIONS

Search Report issued in French Patent Application No. FR 13 51358 dated Nov. 18, 2013.
International Search Report issued in Application No. PCT/EP2014/053027 dated Jun. 23, 2014.
Written Opinion issued in Application No. PCT/EP2014/053027 dated Jun. 23, 2014.
U.S. Appl. No. 14/766,290, "Fibreglass Bin and Waste Incineration Method" filed Aug. 6, 2015.

* cited by examiner

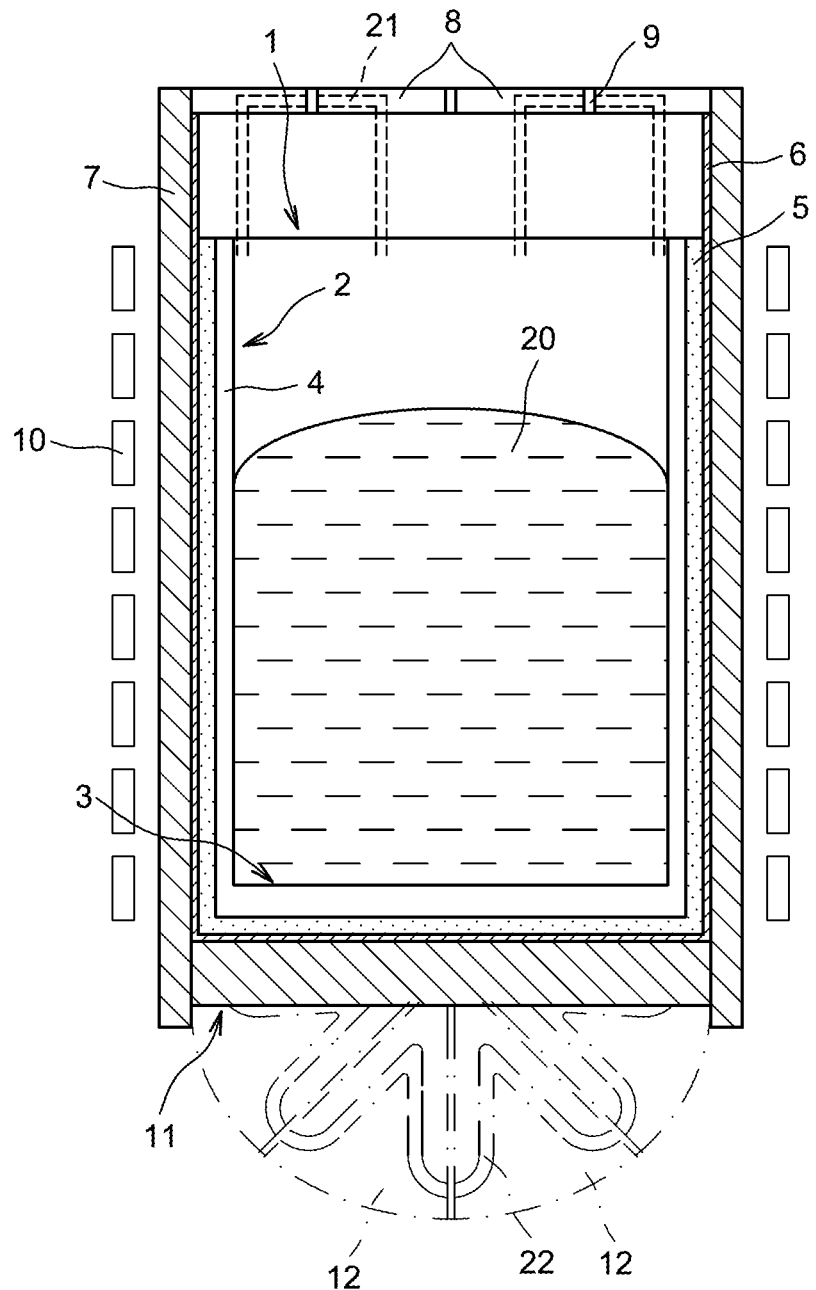

INDUCTION FURNACE AND METHOD FOR TREATING METAL WASTE TO BE STORED

FIELD OF THE INVENTION

This invention relates to an induction furnace designed for melting metal waste and a treatment method for such metal waste.

BACKGROUND OF THE INVENTION

Some metal waste or other waste may be stored for long periods in appropriate containers due to a dangerous, contaminated or toxic fraction contained in them. Preliminary melting of waste is advantageous in order to reduce their volume. It also distributes the contaminants that are more reducible than the metal throughout the volume of the ingot that is finally obtained, and transfers contaminants that are more oxidisable than the metal in the slag with appropriate composition, if possible an oxide-based slag. The result obtained is thus good confinement properties by reducing the free surface of the metal exposed to corrosion and thus the risks of future oxidation of dangerous elements.

There are many types of melting furnaces. Induction heating is most frequently used, and a field coil is then arranged around a crucible inside which waste is poured. The field coil produces high intensity electrical currents in the waste, heating being sufficient to cause melting. The crucible often needs to be cooled by permanent circulation of a cold fluid, normally water, contained in ducts adjacent to the crucible or formed in the crucible. One example of such a type of induction furnace is described in patent FR-2 835 620-A.

The designer finds himself faced with various difficulties. Firstly, severe thermal, chemical and mechanical forces are applied to the crucible, generated by the heat from the molten bath, its corrosive properties and differential expansions due to the small distance between the molten bath and the cooling circuit. The inside face of the crucible that is most exposed to damage because it is immersed in the molten bath is often composed of a ceramic refractory coating, the remainder of the crucible being metallic, but risks of separation between the metal and the ceramic or crumbling of the ceramic remain since the differential expansions are particularly high at their interface. Protection against breakage of the crucible is necessary, which would cause a mix between the molten bath and the cooling water. Forces applied to the crucible can cause premature wear or even breakage, followed by a dangerous mix between the molten bath and the cooling water.

Protection is also necessary against excessive consumption of induction energy due to parasite currents generated in the wall of the crucible. This is often overcome by breaking the crucible down into sectors, in other words dividing it into angular sectors separated by isolating joints, but additional difficulties then appear at the internal face of the crucible where these joints are exposed to the molten bath and problems arising due to differential expansions are exacerbated by the increase in the number of interfaces between different materials. Such a design is disclosed in WO-03/067 166-A, in which sectors are coated with ceramic, although not all the problems encountered are solved.

Other difficulties appear in the process. The molten metal may be poured into an ingot mould at the end of melting, or progressively withdrawn in the form of an ingot during this process. These first processes can lead to an unwanted mix between the metal and its slag during the pour, while the second processes that are based on the use of cold crucibles involve solidification of the metal close to the ingot drawing off orifice and therefore the molten metal and the cooling water must be very close to each other and consequently lead to increased dangers of accidents due to failure of the crucible. In all processes, the installation has to be made leak tight to prevent dissemination of vapours produced due to melting metal.

BRIEF SUMMARY OF THE INVENTION

The invention aims to at least partially overcome these various difficulties. It is above all based on the need for a safe melting process, in which risks of accidents by pouring and dispersion of the molten bath during melting due to a failure of the crucible, or during the final pour, will be eliminated. And in designing the invention, efforts were made to obtain a crucible with acceptable electrical losses, and that is also robust and long lasting.

Firstly, the normal design for treatment by melting of waste generated by nuclear energy was maintained, using a crucible with a metal casing. Metal casings are not subject to unexpected failure and it is easy to incorporate a cooling circuit in them, but electrical energy losses by induction are excessive unless crucibles are constructed from sectors separated by isolating joints, as mentioned above; but protection of joints close to the molten bath must be guaranteed.

Therefore one characteristic idea of the invention was to dissociate the device between the casing as constructed and an internal receptacle in the casing that now forms the crucible. The crucible comprises a refractory internal layer, a metallic external layer and in general an intermediate layer. The internal layer confines the molten material despite the temperatures reached, the external layer provides mechanical strength and cohesion of the crucible against risks of failure of the refractory material, and the intermediate layer is chosen to absorb differential thermal expansions and if possible to provide thermal insulation protecting the metal in the external layer from excessive heating. The crucible is continuous around the circumference, unlike the casing, in order to guarantee its cohesion and impermeability. The external layer is then affected by electrical losses that can be important but are actually acceptable and even low, provided that some design rules discovered by the inventors are respected. And the crucible with its simple structure can be dedicated to a single charge and can be used as the final receptacle for this charge after melting: it is lifted outside the casing and carried away and then replaced by a new crucible for the next charge. The difficult step of pouring molten waste disappears, and the continuity of the crucible structure remains important to guarantee confinement of waste and to prevent radiation leaks. Full crucibles are simply lowered into sealed storage receptacles designed for them. The crucible is installed into the casing with a clearance that is maintained at all temperatures, because the external layer of the crucible and the casing are normally made from identical metals or metals with similar coefficients of expansion.

The breakdown of the device into two parts nested into each other (crucible and casing) has already been done and disclosed in U.S. Pat. No. 7,197,061-B, however in this case the casing and the crucible are made from refractory material, which in this case is not possible for applications requiring high safety, and in DE-22 43 769-A in which the content is similar.

Therefore in its general form, the invention relates to a metallic waste melting induction furnace, with low energy consumption and high safety level, comprising a field coil, a circular metallic casing broken down into sectors separated by electrically insulating layers, surrounded by the field coil and provided with cooling fluid ducts and a sole plate extending under the casing, characterised in that it comprises a crucible inside the casing composed of a circular wall and a bottom, the crucible being placed on the sole plate, surrounded by the casing and separated from the casing by a continuous clearance uniform around the circumference and composed of three concentric layers including an internal refractory layer, an intermediate layer composed of compressible material and an external metallic layer.

The typical process in the invention using this furnace is characterised in that the waste is left until solidification in the crucible after having been poured and melted, and the crucible is then removed and put into storage with the waste.

The internal layer resists the heat of the molten bath with which it is in contact, the external layer contributes to cohesion of the crucible and the intermediate layer limits heat transfers towards the outside. The internal layer must resist corrosion by metal liquid for a limited period (from several hours to several days); it may be made from ceramic (for example based on silicon carbide); the intermediate layer may be made from a compressible material (in order to absorb differential thermal expansions without stresses in the crucible) and the external layer (like the metal casing) may preferably be made from a metal that does not conduct electricity in order to reduce induced currents in it.

The sole plate may be separate from the casing so that it can be lowered and the crucible can be exposed after solidification, so that it can be easily removed.

BRIEF DESCRIPTION OF THE DRAWING

The various aspects of the invention will now be described more fully with reference to the single FIGURE that represents one embodiment given as an illustrative example.

DESCRIPTION OF EXAMPLE EMBODIMENTS

The melting device comprises a multi-layer crucible 1 comprising a cylindrical sidewall 2 and a bottom 3 adjacent to said sidewall 2. The sidewall 2 and the bottom 3 each comprise three layers consisting of, working from the inside towards the outside, firstly an internal layer 4 made from a material resistant to corrosion by the molten metal bath 20 present in the crucible 1 during the entire operation, typically for a few hours; this material must be a poor conductor of electricity to avoid excessively clipping the induced electromagnetic field intended to heat the content of the crucible. The crucible 1 also contains an intermediate layer 5 made from a thermally insulating material to limit the thermal flux towards the outside; the insulation is slightly compressible, without losing its thermal insulation properties, to adapt to differential expansions between the internal layer 4 and an external layer 6 between which it is inserted; it may be a felt composed of refractory fibres. Finally, the external layer 6 is used to delimit and manipulate the crucible 1; it is made from a metal that is also not a very good conductor of electricity; since it is not in contact with the molten metal 20 and its temperature is lower than the internal layer 4, it will act as a confinement barrier in case the internal layer should break.

The crucible 1 is placed in a furnace composed of a circular casing 7 that surrounds the crucible 1 and keeps its external surface at a lowest possible temperature equal to a few hundred degrees. The casing 7 is also made from a metal that is a poor conductor of electricity. In order to further reduce magnetic field losses, the casing 7 is advantageously divided into sectors 8 extending around sectors of a circle separated by insulating joints 9 as known in prior art, which almost entirely eliminates induced currents. Cooling may be achieved by internal water circulation or even air circulation through ducts not shown formed in the sectors 8. The power lost in the sectors 8 becomes negligible if the equivalent diameter of each sector 8 (equivalent diameter D calculated from the area S of its cross-section, $D=(4.S/\pi)\,0.5$) is less than half the penetration depth P of currents induced in the material from which the sectors are made (P=503 (resistivity of the material of the sector/frequency of induced currents)$^{0,5}$). The casing 7 confines the molten metal if the crucible 1 breaks. The casing 7 is suitable for maintaining leak tightness against gases produced by melting the content of the crucible 1 and it may be complemented for this purpose by a lid not shown placed on it. It should be emphasised that the crucible 1 is not divided into sectors but is continuous around its circumference so that it can have good resistance to the molten bath.

An induction solenoid 10 surrounds the casing 7; it is powered by alternating current and it creates the electromagnetic field that heats the content until liquefaction.

We will now describe the method by which the device is optimised to moderate electrical losses, essentially in the external layer 6 of the casing 7. Resistance measurements were made at different frequencies on a sectorised casing 7 in order to evaluate the frequency starting from which the power lost in the casing 7 becomes negligible.

The casing is composed of 32 sectors with equivalent diameter equal to 2.4 cm and height 40 cm forming a cylinder with an inside diameter of 33.2 cm. The sectors 8 are made from stainless steel with resistivity $70\times10^{-8}$ Ohm·m.

This casing 7 is surrounded by a field coil 10 with 17 turns with inside diameter 38 cm and height 30 cm. Its cross-section is equal to 50 mm².

The resistance of this casing 7 as it affects the field coil 10 and therefore the power dissipated in it was measured at different frequencies and compared with the resistance of the field coil 10 and therefore the power dissipated in the field coil 10 (Table 1).

TABLE 1

| FREQUENCY IN Hz | FIELD COIL RESISTANCE IN m·Ω | CASING RESISTANCE IN m·Ω | CASING RESISTANCE TO FIELD COIL RESISTANCE RATIO | CURRENT PENETRATION DEPTH IN THE CASING IN cm |
|---|---|---|---|---|
| 30 | 6.84 | 0 | 0 | 7.68 |
| 50 | 6.95 | 0 | 0 | 5.95 |
| 60 | 7 | 0 | 0 | 5.43 |

TABLE 1-continued

| FREQUENCY IN Hz | FIELD COIL RESISTANCE IN m·Ω | CASING RESISTANCE IN m·Ω | CASING RESISTANCE TO FIELD COIL RESISTANCE RATIO | CURRENT PENETRATION DEPTH IN THE CASING IN cm |
|---|---|---|---|---|
| 80 | 7 | 0.02 | 0.003 | 4.71 |
| 100 | 7 | 0.06 | 0.009 | 4.21 |
| 120 | 6.85 | 0.12 | 0.017 | 3.84 |
| 140 | 6.76 | 0.18 | 0.027 | 3.56 |
| 160 | 6.88 | 0.23 | 0.033 | 3.33 |
| 180 | 7.03 | 0.27 | 0.038 | 3.14 |
| 200 | 7 | 0.32 | 0.045 | 2.98 |
| 400 | 7 | 1.10 | 0.157 | 2.1 |
| 800 | 7.3 | 4.74 | 0.649 | 1.49 |
| 1600 | 7 | 18.5 | 2.643 | 1.05 |

It can be seen that the power lost in the sectorised casing 7 becomes negligible (less than 0.3% of the power lost in the unoptimised field coil) when the penetration depth of induced currents is more than twice the equivalent diameter of the sectors.

An induction specialist might think that it would have been sufficient for the induced current penetration depth to be equal to the equivalent diameter of sectors 8 in order to minimise losses, however it is observed that at 200 Hz (for a penetration depth of induced currents equal to 2.98 cm compared with the 2.4 cm for equivalent diameter of sectors 8), the power lost in the casing 7 is still equal to 4.54% of the power lost in the field coil 10, which is 15 times more than at 80 Hz.

The furnace also includes a sole plate 11 on which the crucible 1 is placed. The sole plate 11 may also be divided into sectors 12 in order to prevent losses of electromagnetic energy. Fluid circulation channels 22 are formed in the sectors 12 in order to cool the sectors. The crucible 1 is housed in the casing 7 with clearance when cold, in other words before the beginning of heating or after cooling of the crucible 1, and the sole plate 11 is also placed in the casing 7 with a clearance so that it can be raised and lowered at will by any device, so that the crucible 1 can be taken out of the casing 7 either through the top or the bottom. This clearance is compensated when hot during melting by expansion of the crucible 1 that comes into contact with the casing 7 which can improve cooling of the crucible 1 and prevent overheating.

The waste treatment process is as follows. The waste is firstly poured in the crucible 1 and the solenoid 10 is then switched on to induce an electromagnetic field which in turn induces induced currents in the charge, increasing its temperature until it liquefies. The molten bath 20 is kept for as long as necessary and is then allowed to cool to become a solidified ingot. In a manner characteristic of the invention, the crucible 1 is then taken out of the furnace and is stored with the ingot in an appropriate container. This thus prevents pouring of the molten bath 20 or the progressive exit of a solidified ingot, and among other problems, difficulties consecutive to maintaining a seal for the gases. Accidental contact between the molten bath 20 and water in the cooling ducts 21 and 22 is extremely unlikely due to the number of layers and the lower temperature of the external layers, which would reduce corrosion and risks of accidents even after failure of the internal layer 4. Treatment of the slag at the top of the molten bath 20 is easy, due to the lack of any disturbing movements. A fairly high temperature can be accepted for the internal layer 4, even at the price of more severe corrosion, because the crucible 1 is used only once and its functional life is short (between a few hours and a few days). Therefore the internal layer 4 can have a short life. The intermediate layer 5 limits the thermal losses to the casing 7 and the cooled sole plate 12, which enables lower heating power. Differential expansions produce much lower stresses due to the clearance between the crucible 1 and the casing 7 and the presence of the compressible intermediate layer 5.

In one particular embodiment, the internal layer 4 was made from ceramic, based on silicon carbide with an inside diameter of 330 mm, a height of 1 050 mm and a thickness of 25 mm. The intermediate layer 5 was made from mineral fibres 10 mm thick and 1 050 mm high. The external layer 6 was made from 5 mm thick stainless steel, 1 050 mm high. The inside diameter of the casing 7 was 412 mm, its thickness was 20 mm and it contained thirty sectors 8 separated by 3 mm of electrical insulator for the joints 9 and its height was 1 300 mm. Differential expansion of the external layer 6 made it possible to compensate the 2 mm clearance between the crucible 1 and the casing 7 for a temperature of this external layer 6 equal to about 300°.

The inside diameter of the solenoid 10 was 500 mm and its height was 500 mm, and it was powered at a frequency of about 50 Hz. It contained five turns and its height was adjustable to monitor the level of the molten bath 20. The penetration depth of induced currents with such a frequency was 7 cm in the stainless steel. A radius of at least 10 cm for the molten bath 20 (in this case it is 16.5 cm) would then make it possible to obtain good efficiency of electromagnetic heating, without creating antagonist induced currents beyond the centre of the molten bath 20.

The outside diameter of the sole plate 11 was 412 mm and it was positioned about 20 mm lower than the bottom of the solenoid 10. It was made from stainless steel.

The required inductive power for a melting capacity of the order of 60 kg per hour at about 1450° C. was equal to about 230 kW, obtained by applying a voltage of about 45 Volts to the terminals of the solenoid 10. The thermal power to be evacuated in the induction coil was then about 68 kW. The thermal power lost by the Joule effect in the external layer 6 of the crucible 1 was of the order of 48 kW, which is acceptable. The duration of the melting operation is then of the order of 12 hours which is compatible with the resistance to corrosion of the ceramic used.

The following advantages are achieved. In separating the crucible itself from the cooled external metal casing, differential thermal expansions are reduced both in the crucible and the casing. The crucible itself becomes a consumable part replaceable after each melting, while the metal casing is no longer in contact with the molten metal and is therefore not subject to corrosion. If heat from the molten metal causes an accident, failure affects the crucible only, while the metal casing containing the cooling ducts remains sound. The casing may be divided into sectors without any disadvantages because the area of the crucible remains continuous. In keeping waste in the crucible until solidification, it becomes possible to evacuate vapours before taking the crucible out of the casing and disposing of the solidified waste, such that leak tightness of the furnace can be maintained without any difficulty. Finally, it is obvious that it is extremely easy to remove and store the ingot because all that is necessary is to manipulate the crucible.

What is claimed is:

1. Induction furnace for melting metallic waste, with low energy consumption and high safety level, comprising a field coil (10), a circular metallic casing (7) broken down into sectors (8) separated by electrically insulating layers, surrounded by the field coil and provided with cooling fluid ducts (21), and a sole plate (11) extending under the casing, characterised in that it comprises a crucible (1) inside the casing (7) and composed of a circular wall and a bottom, the crucible being:

placed on the sole plate (11),
   surrounded by the casing (7),
   separated from the casing by a clearance,
   continuous and uniform around its circumference and
   composed of three concentric layers including an internal refractory layer (4), an intermediate layer (5) composed of compressible material and an external metallic layer (6).

2. Melting furnace according to claim 1, characterised in that the internal layer is made from ceramic, for example based on silicon carbide.

3. Melting furnace according to claim 1, characterised in that the intermediate layer is made from a thermally insulating material.

4. Melting furnace according to claim 1, characterised in that the intermediate layer has a fibrous structure.

5. Melting furnace according to claim 1, characterised in that sectors (8) have an equivalent diameter (D) less than half the penetration depth P of currents induced in the material from which the sectors are made.

6. Treatment process for metal waste to be stored, in which a furnace comprising a field coil (10), a circular metallic casing (7) broken down into sectors (8) separated by electrically insulating layers, surrounded by the field coil and provided with cooling fluid ducts (21), and a sole plate (11) extending under the casing, the furnace further comprising a crucible (1) inside the casing (7) and composed of a circular wall and a bottom, the crucible being:

placed on the sole plate (11),
   surrounded by the casing (7),
   separated from the casing by a clearance,
   continuous and uniform around its circumference and
   composed of three concentric layers including an internal refractory layer (4), an intermediate layer (5) composed of compressible material and an external metallic layer (6), the waste being poured into the crucible (1) and the field coil (10) being started to melt the waste, characterised in that waste is left until solidification in the crucible, and the crucible (1) is then removed and put into storage with the waste.

* * * * *